(12) United States Patent
Garrett et al.

(10) Patent No.: US 9,158,789 B2
(45) Date of Patent: Oct. 13, 2015

(54) COORDINATED GEOSPATIAL, LIST-BASED AND FILTER-BASED SELECTION

(75) Inventors: Tricia Y. Garrett, Raleigh, NC (US);
Carolyn Hyink, Austin, TX (US);
Pamela A. Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 13/341,246

(22) Filed: Dec. 30, 2011

(65) Prior Publication Data

US 2013/0169673 A1    Jul. 4, 2013

(51) Int. Cl.
*G06F 17/30* (2006.01)

(52) U.S. Cl.
CPC .................. *G06F 17/30241* (2013.01)

(58) Field of Classification Search
CPC ........... G06F 3/00; G06F 11/00; G06F 17/00; H04N 21/00
See application file for complete search history.

(56) References Cited

U.S. PATENT DOCUMENTS

| | | | |
|---|---|---|---|
| 6,061,688 A | 5/2000 | Kilpatrick et al. | |
| 7,373,244 B2 | 5/2008 | Kreft | |
| 2005/0034075 A1 | 2/2005 | Riegelman et al. | |
| 2007/0294284 A1 | 12/2007 | Evans | |
| 2009/0177381 A1* | 7/2009 | Taniguchi et al. | 701/208 |
| 2009/0254840 A1* | 10/2009 | Churchill et al. | 715/753 |
| 2010/0017733 A1 | 1/2010 | Barros | |
| 2010/0082454 A1 | 4/2010 | Narayanaswami et al. | |
| 2010/0191797 A1* | 7/2010 | Seefeld et al. | 709/203 |
| 2010/0257477 A1 | 10/2010 | Nielsen et al. | |
| 2011/0055244 A1 | 3/2011 | Donelli | |
| 2012/0313780 A1* | 12/2012 | Stout et al. | 340/540 |

OTHER PUBLICATIONS

"Drawing a Circle, Rectangle, or Polygon on the Map" DeLorme, available at: http://support.delorme.com/WebHelp/topo9/delorme_help/p_using_the_draw_tools/4_circles_rectangles_polygons/drawing_a_circle,_rectangle,_or_polygon_on_the_map.htm, last accessed Dec. 30, 2011, 1 page.

"Production Line Tool Sets Discussion Forum" esri, available at: http://forums.esri.com/Thread.asp?c=60&f=437&t=300621, last accessed on Dec. 30, 2011, 2 pages.

"Overlapping Data in a MapGuide Layer: Selecting Map Features by Area," Pima County GIS, available at: http://gis.pima.gov/mapguide/mgtips/overlaps/selectbyarea.cfm, last accessed Dec. 30, 2011, 3 pages.

* cited by examiner

*Primary Examiner* — Ke Xiao
*Assistant Examiner* — Raffi Isanians
(74) *Attorney, Agent, or Firm* — Jeffrey T. Holman

(57) ABSTRACT

A geospatial and list-based mapping system, including: a mapping engine configured to: present a map display on a display device, wherein the map display includes elements within a viewing area of the map display, wherein the elements include geospatial characteristics; and present a list display on the display device, wherein the list display includes a customizable list having the elements from the map display; and synchronizer configured to: synchronize the map display and the list display to concurrently update the elements according to a user input.

20 Claims, 7 Drawing Sheets

COORDINATED GEOSPATIAL, LIST-BASED AND FILTER-BASED SELECTION

BACKGROUND

Geospatial and list-based mapping software generally can be useful for presenting users with a list of elements or locations that correspond to a geographic area or region in multiple formats. A map view may provide a visual location of a given element, while a list view may provide specific details for the location according to a purpose of the software.

Such mapping software is frequently used for applications that allow users to view elements related to the specific application, including real estate, and other uses. Providing detailed information related to each element may allow a user to compare results according to filtered results based on a location of each element and details corresponding to the compared elements.

SUMMARY

Embodiments of a system are described. In one embodiment, the system is a geospatial and list-based mapping system. The system includes: a mapping engine configured to: present a map display on a display device, wherein the map display includes elements within a viewing area of the map display, wherein the elements include geospatial characteristics; and present a list display on the display device, wherein the list display includes a customizable list having the elements from the map display; and synchronizer configured to: synchronize the map display and the list display to concurrently update the elements according to a user input. Other embodiments of the system are also described. Other embodiments of a method and a computer program product are also described. Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
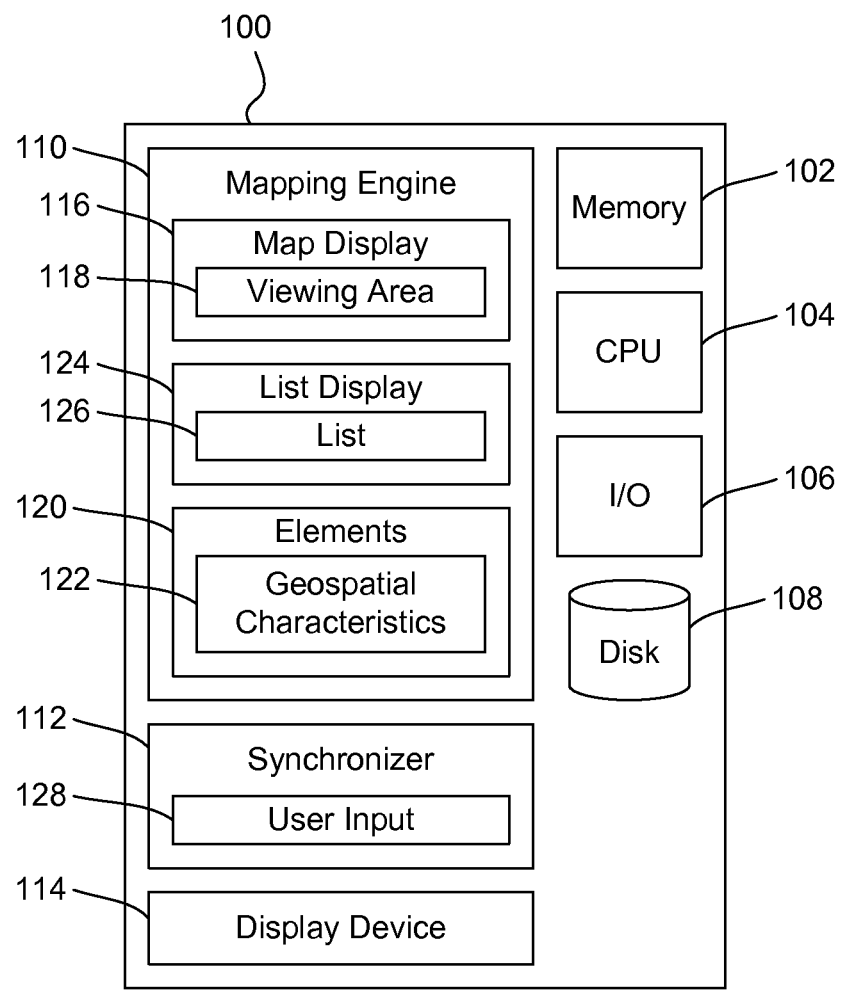
FIG. 1 depicts a schematic diagram of one embodiment of a geospatial and list-based mapping system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for coordinated geospatial and list-based mapping. Specifically, the system synchronizes a map display and a list display on a display device by concurrently updating elements in the list display that are presented on the map display. The update occurs in response to a user input to filter, select, highlight, or otherwise modify the view in either the map display or the list display. Thus, when one display is modified, the other display may be updated automatically without additional user input.

Some conventional systems present a map display and a list display containing shared elements, such that the map display presents a geographic location of a given element, and the list display presents details about the given element. While this allows the use of some coordination between the list and map displays to compare elements in the displays, conventional systems do not concurrently update the list display and map display. Providing coordinated mapping and concurrent updating for a map display and a list display allows bidirectional interaction between the displays and multiple linked selection and filtering capabilities in the displays.

Figure 7:
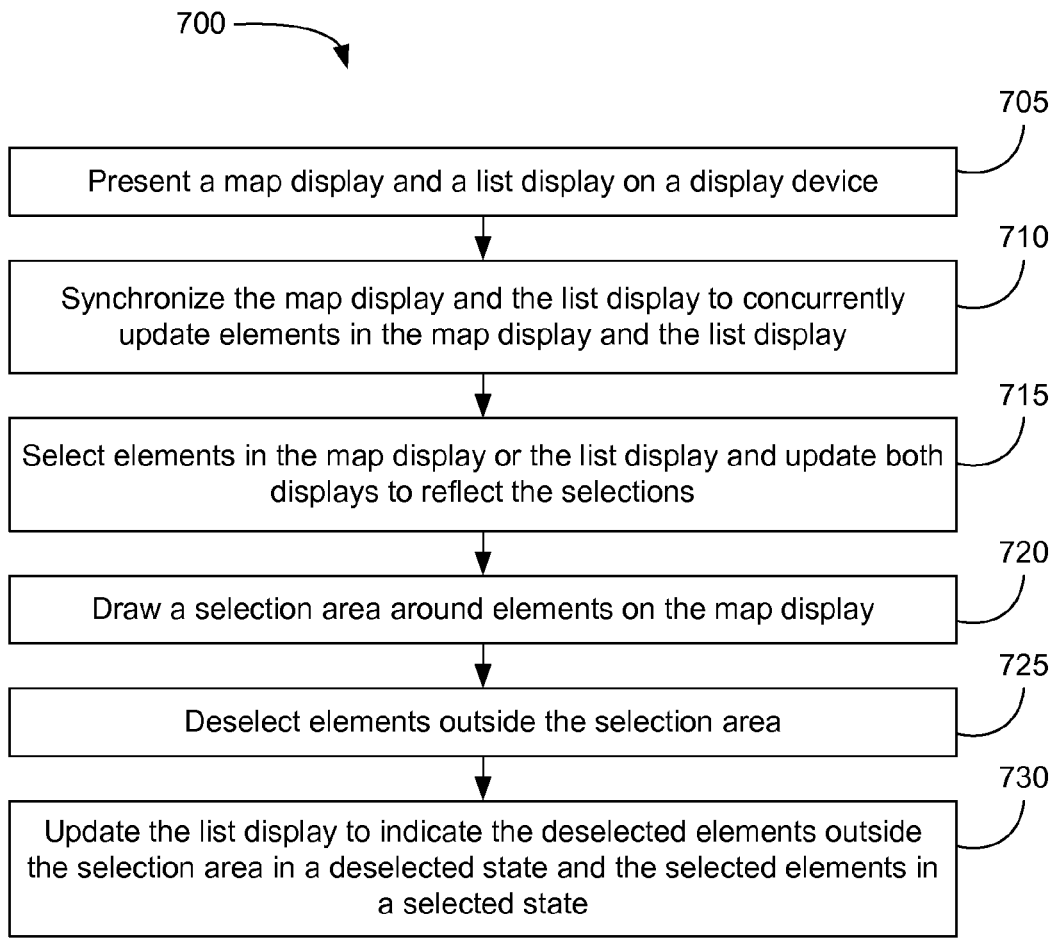
FIG. 7 depicts a flowchart diagram of one embodiment of a method for coordinated geospatial and list-based mapping.

FIG. 1 depicts a schematic diagram of one embodiment of a geospatial and list-based mapping system. The depicted mapping system 100 includes various components, described in more detail below, that are capable of performing the functions and operations described herein. In one embodiment, at least some of the components of the mapping system 100 are implemented in a computer system. For example, the functionality of one or more components of the mapping system 100 may be implemented by computer program instructions stored on a computer memory device 102 and executed by a processing device 104 such as a CPU. The mapping system 100 may include other components, such as a disk storage drive 108, input/output devices 106, a mapping engine 110, a synchronizer 112, and a display device 114. Some or all of the components of the mapping system 100 may be stored on a single computing device or on a network of computing devices, including a wireless communication network. The mapping system 100 may include more or fewer components or subsystems than those depicted herein. In some embodiments, the mapping system 100 may be used to implement the methods described herein as depicted in FIG. 7.

In one embodiment, the mapping engine 110 is configured to display a geographic area on a map display 116 on a display device 114 according to a predetermined purpose for the mapping system 100. For example, the geographic area may be an area selected by a user, such as any part of a mapped region stored on a database. In one embodiment, the mapped region stored on a database may include detailed maps of the world, a specific country, or a specific city. The mapping engine 110 may allow a user to zoom in or out and navigate within the mapped region to focus on different areas within the mapped region. The map display 116 includes a viewing area 118 that displays the visible portion of the mapped region. As the user drags a mouse cursor, zooms, or performs other actions within the viewing area 118, the portion of the mapped region visible in the viewing area 118 may change.

The map display 116 shows elements 120 that have geospatial characteristics 122, allowing the elements 120 to be indicated on in the mapped region according to a location of each element 120. The location for each element 120 may be determined by an address, a coordinate, a combination of both, or some other method of describing the location. Elements 120 may include other geospatial characteristics based on the location. In some embodiments, at least some of the details for an element 120 may be displayed on the map display 116 in response to a user action within the map display 116, such as a cursor rollover of the corresponding element 120.

In one embodiment, the mapping engine 110 is also configured to present a list display 124 on the display device 114. In some embodiments, the map display 116 and the list display 124 are presented side-by-side or in some other simultaneous manner—either on the same display device 114 or on multiple display devices 114—such that the map display 116 and the list display 124 are visible and usable at the same time. The list display 124 may show a list 126 including details corresponding to the elements 120 shown in the map display 116. The list 126 may include some or all of the geospatial information for each element 120.

In one embodiment, the mapping system 100 includes a synchronizer 112 configured to synchronize the data in the map display 116 and the list display 124 according to a user input 128 that modifies either the map display 116 or the list display 124. For example, the user input 128 may include filtering the elements 120 in either the list display 124 or the map display 116, selecting an element 120 in either display, or deselecting an element 120 in either display, among other operations. The synchronizer 112 concurrently updates each of the displays when either display is modified or updated to provide bidirectional interaction between the displays.

Figure 2:
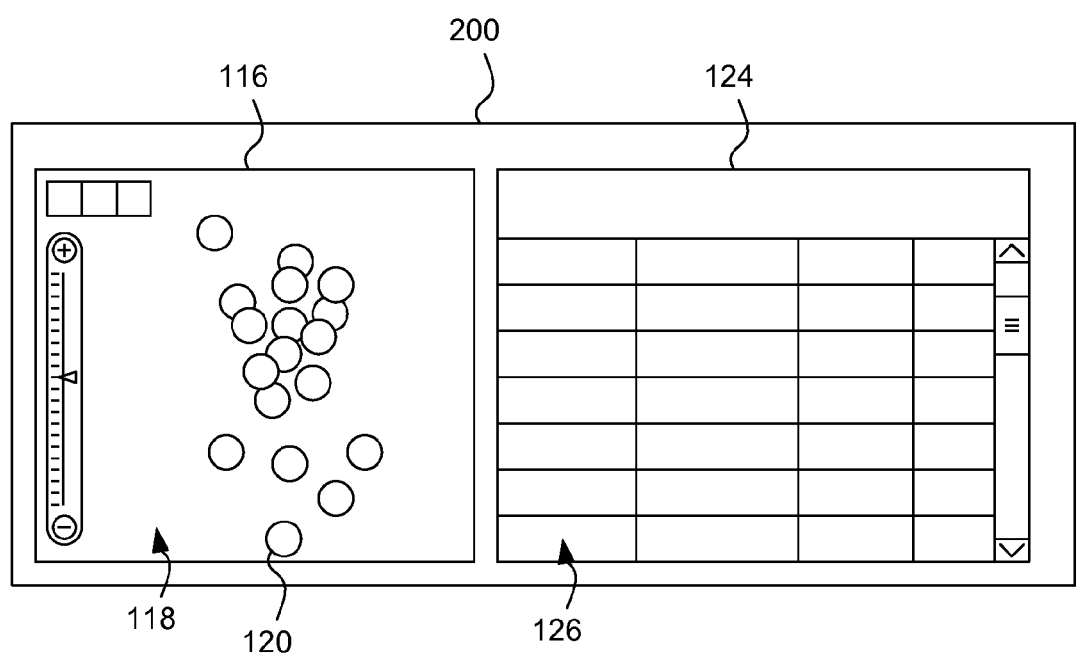
FIG. 2 depicts a schematic diagram of one embodiment of the geospatial and list-based mapping system of FIG. 1.

FIG. 2 depicts a schematic diagram of one embodiment of the geospatial and list-based mapping system 100 of FIG. 1. While the mapping system 100 is described herein in conjunction with the map display 116 and the list display 124 of FIG. 2, the mapping system 100 may be used in conjunction with any map display 116 or list display 124.

In one embodiment, the map display 116 and the list display 124 may be presented on a display device 114 in a user interface 200. The user interface 200 may include a web browser or other application. The map display 116 may allow a user to zoom in or out on the mapped region within the viewing area 118 or to modify the type of geography that is displayed (e.g., satellite view, flat view, road view, etc.). The list display 124 may allow the user to scroll through elements 120 in the list 126. Mapping systems 100 for Internet applications are generally implemented in conjunction with a search engine to allow the user to search for specific locations or to search for specific elements 120 located within a general area.

A search input may display resulting elements 120 on the map display 116 and the list display 124. The map display 116 may present the elements 120 in any manner, such as circles displayed within the viewing area 118 in locations of the mapped region that correspond to the physical location of each element 120. In some embodiments, the map display 116 may present some details for an element 120 when the user rolls over the element 120 with a mouse cursor or clicks on the element 120. The list display 124 may present the elements 120 and the corresponding details in any manner, such as rows in a spreadsheet format.

Figure 3:
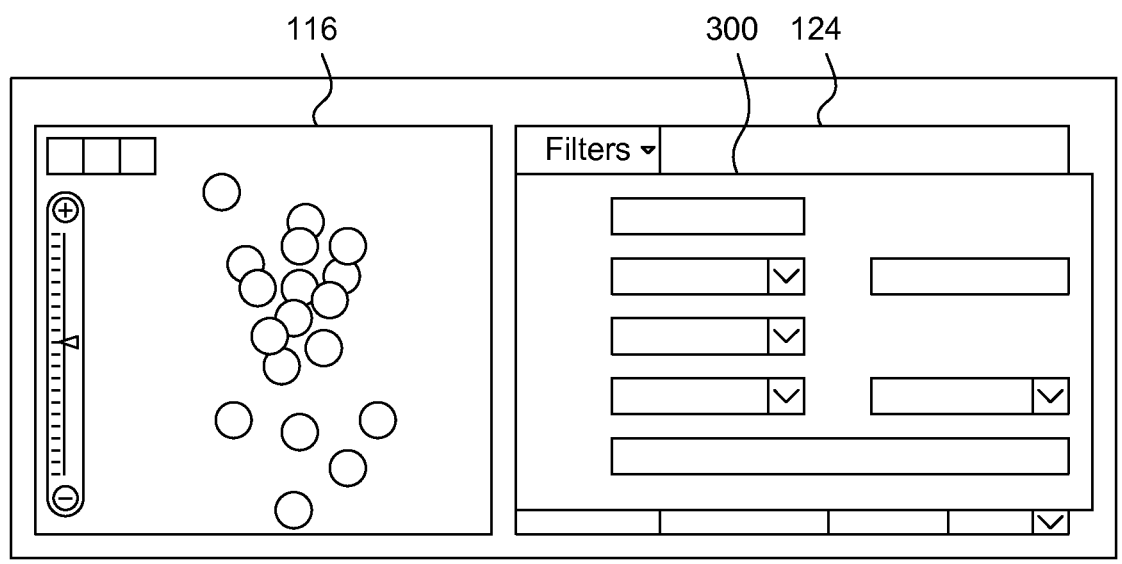
FIG. 3 depicts a schematic diagram of one embodiment of the geospatial and list-based mapping system of FIG. 1.

FIG. 3 depicts a schematic diagram of one embodiment of the geospatial and list-based mapping system 100 of FIG. 1. While the mapping system 100 is described herein in conjunction with the map display 116 and the list display 124 of FIG. 3, the mapping system 100 may be used in conjunction with any map display 116 or list display 124.

In one embodiment, the list display 124 includes a filter 300 that allows the user to filter content displayed in the list display 124. Because the synchronizer 112 concurrently updates both displays when a change is made to the content of either display, filtering the content in the list display 124 also filters the content shown in the map display 116. In some embodiments, the filter 300 may be included in the map display 116, or separately from the map display 116 and the list display 124 but within the mapping system 100 on some other portion of the display device 114.

In one embodiment, the filter 300 allows the user to perform an initial search for a given element 120 or instances of elements 120 within the mapped region. In another embodiment, the filter 300 allows the user to refine an initial search according to predetermined categories, keywords, or other filtering methods. The mapping system 100 filters the elements 120 within the mapped region and concurrently updates the map display 116 and the list display 124 to present the filtered elements 120 in both displays. The filtered results may include a default state for the elements 120, such as selecting all of the filtered elements 120 in both displays, deselecting all of the filtered elements 120 in both displays, or some other default state.

Figure 4:
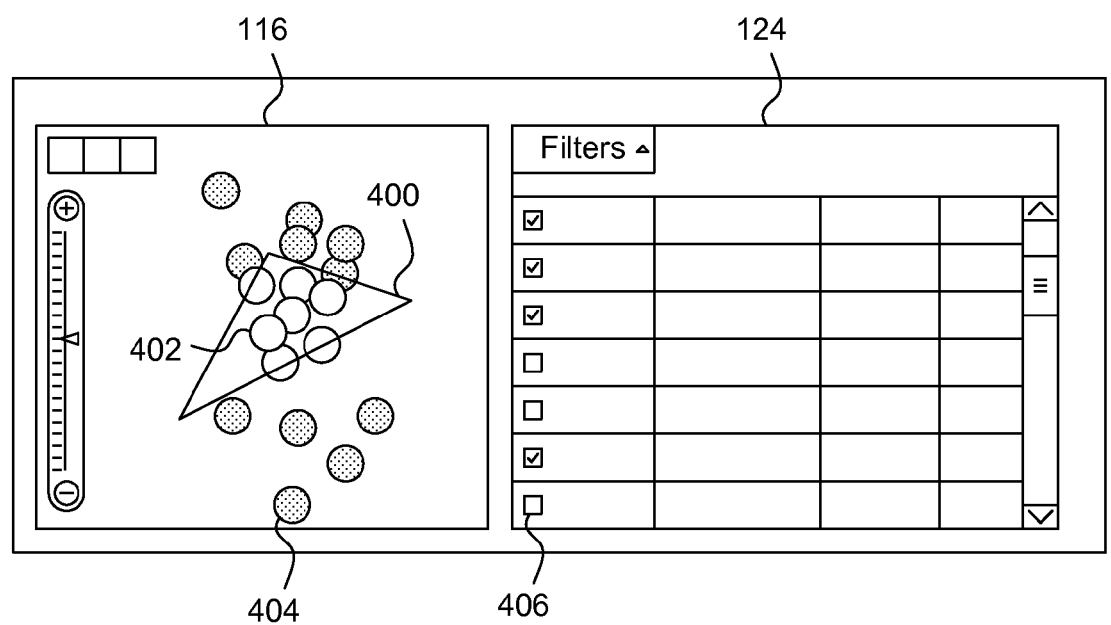
FIG. 4 depicts a schematic diagram of one embodiment of the geospatial and list-based mapping system of FIG. 1.

FIG. 4 depicts a schematic diagram of one embodiment of the geospatial and list-based mapping system 100 of FIG. 1. While the mapping system 100 is described herein in conjunction with the map display 116 and the list display 124 of FIG. 4, the mapping system 100 may be used in conjunction with any map display 116 or list display 124.

In one embodiment, the mapping engine 110 is configured to draw a selection area 400 around elements 120 within the viewing area 118 of the map display 116. If none of the elements 120 are currently selected, the mapping engine 110 selects all of the elements 120 within the selection area 400. If all of the elements 120 are currently selected when the selection area 400 is drawn, the mapping engine 110 deselects the elements 120 outside of the selection area 400. When the selection area is drawn, the synchronizer 112 updates the map display 116 and the list display 124 so that all of the selected elements 120 within the selection area 400 are shown in both the map display 116 and the list display 124 in a selected state 402, and all of the deselected elements 120 outside of the selection area 400 are shown in both the map display 116 and the list display 124 in a deselected state 404.

In one embodiment, the deselected state 404 is indicated in the map display 116 by graying out the unselected elements 120. The deselected state 404 may be indicated in the list display 124 by un-checking a check box 406 corresponding to each of the unselected elements 120. In one embodiment, the selected state 402 is indicated in the map display 116 by displaying the selected elements 120 with a given shade or color. The selected state 402 may be indicated in the list display 124 by checking the check box 406 corresponding to each of the selected elements 120. The deselected state 404 and selected state 402 may be indicated in any manner to distinguish the deselected elements 120 from the selected elements 120.

Figure 5:
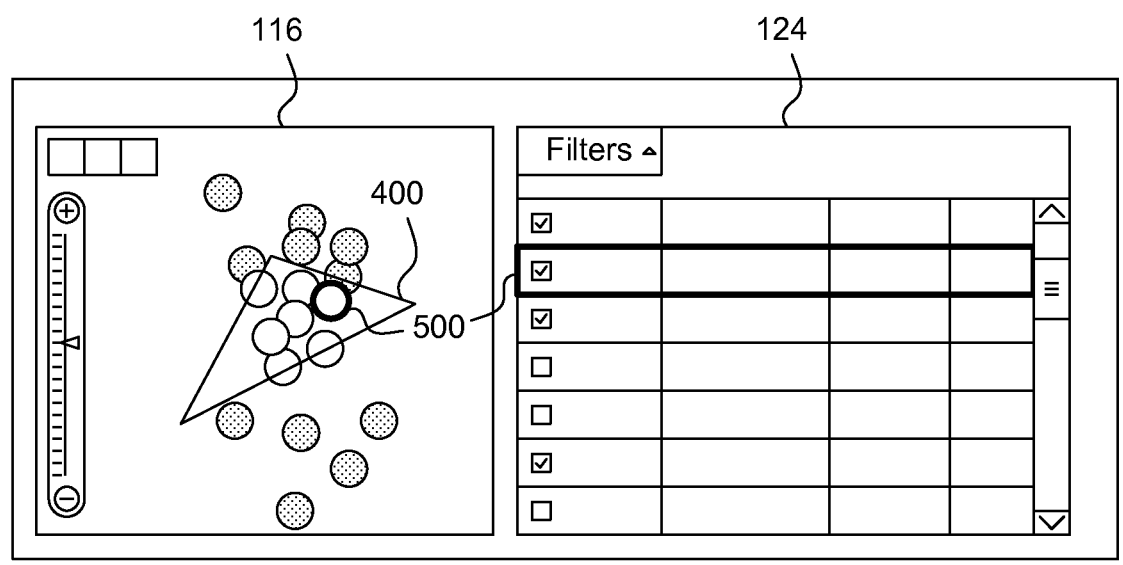
FIG. 5 depicts a schematic diagram of one embodiment of the geospatial and list-based mapping system of FIG. 1.

FIG. 5 depicts a schematic diagram of one embodiment of the geospatial and list-based mapping system 100 of FIG. 1. While the mapping system 100 is described herein in conjunction with the map display 116 and the list display 124 of FIG. 5, the mapping system 100 may be used in conjunction with any map display 116 or list display 124.

In one embodiment, the user may highlight an element 120 in addition to selecting/deselecting elements 120. The highlighted element 120 may be depicted in a highlighted state 500. The highlighted state 500 may be indicated in map display 116 and the list display 124 by outlining the element 120 and the cells corresponding to the element 120, bolding the element 120 and text corresponding to the element 120, changing a color of the element 120 and the text or cell corresponding to the element 120, or any other manner of highlighting the element 120, such that the element 120 is distinguishable from the selected elements 120 and the deselected elements 120.

In various embodiments, selected elements 120 inside the selection area 400 may be highlighted, deselected elements 120 outside the selection area 400 may be highlighted, or elements 120 anywhere in the viewing area 118 of the map display 116 may be highlighted if no selection area has been chosen. Highlighted elements 120 may allow the user to more easily compare elements 120 within the map display 116 and the list display 124. In some embodiments, multiple elements 120 may be highlighted.

Figure 6:
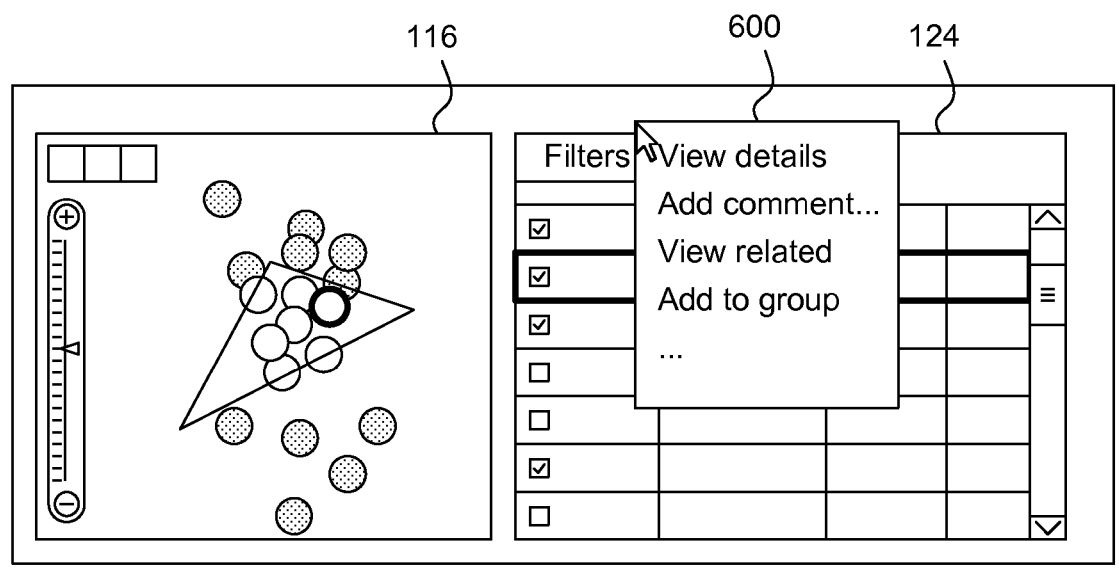
FIG. 6 depicts a schematic diagram of one embodiment of the geospatial and list-based mapping system of FIG. 1.

FIG. 6 depicts a schematic diagram of one embodiment of the geospatial and list-based mapping system 100 of FIG. 1. While the mapping system 100 is described herein in conjunction with the map display 116 and the list display 124 of FIG. 6, the mapping system 100 may be used in conjunction with any map display 116 or list display 124.

In one embodiment, the map display 116 and the list display 124 include menu options 600 that open in a box or other menu view in response to a cursor input. The menu options 600 may allow the user to perform various operations within the map display 116 and the list display 124. In one embodiment, the menu options 600 are opened by right-clicking within the map display 116 or the list display 124. The menu options 600 may be shared by the map display 116 and the list display 124, such that the menu options provide interactivity with the elements 120 in both displays. In some embodiments, the menu options 600 may allow the user to perform operations on items selected in the list display 124 or the map display 116. In other embodiments, operations for the selected items may be implemented using buttons or other user interface elements 120 proximate the list display 124 or the map display 116.

FIG. 7 depicts a flowchart diagram of one embodiment of a method 700 for coordinated geospatial and list-based mapping. Although the method 700 is described in conjunction with the mapping system 100 of FIG. 1, embodiments of the method 700 may be implemented with other types of mapping systems 100.

In one embodiment, the method 700 includes presenting 705 a map display 116 and a list display 124 on a display device 114. The map display 116 and the list display 124 may be presented on the display device 114 simultaneously, in some embodiments. The map display 116 may include elements 120 that have geospatial characteristics and may be located within a viewing area 118 of the map display 116. The geospatial characteristics may include data corresponding to the location in a mapped region for the map display 116, such as address information, coordinates, and other data. The elements 120 may also include other descriptive information that may be useful for comparing elements 120 or for identifying specific elements 120. The list display 124 includes a customizable list 126 including the elements 120 from the map display 116. The list 126 may be customized by altering the elements 120 selected or highlighted in the list display 124 or the map display 116, or by altering the portion of the mapped region shown in the viewing area of the map display 116.

The method 700 also synchronizes 710 the map display 116 and the list display 124 to concurrently update the elements 120 according to a user input 128. When the user provides input to the mapping system 100 to make changes to the list display 124, the map display 116, or the elements 120 in either display, the mapping system 100 synchronizes the map display 116 and the list display 124 so that the changes are shown in both displays concurrently. This allows the user to view changes made in either display concurrently across both displays, which provides greater interactivity and selection capabilities.

In one embodiment, the method selects 715 an element 120 in either the map display 116 or the list display 124 and concurrently synchronizes the map display 116 and the list display 124 to present the selected element 120 in both the map display 116 and the list display 124 in a selected state. In one embodiment, the mapping system 100 allows the user to draw 720 a selection area 400 in the viewing area 118 of the map display 116 to select elements 120 within the selection area 400. Elements 120 outside the selection area 400 are deselected 725. The selected elements 120 are presented in the selected state 402 and the deselected elements 120 are displayed in a deselected state 404. The selected state 402 and deselected state 404 may use any manner of highlighting, shading, coloring, or other technique to visually distinguish the selected elements 120 from the deselected elements 120 in the map display 116 and the list display 124. The list display 124 is also updated 730 to indicate the deselected elements 120 outside the selection area 400 in a deselected state 404 and the selected elements 120 in a selected state 402.

In one embodiment, the mapping system 100 allows the user to highlight an element 120 in either the map display 116 or the list display 124. The highlighted element 120 may be displayed in a highlighted state in the map display 116 and the list display 124. The highlighted state may include any manner of highlighting or otherwise distinguishing the highlighted element 120 from selected elements 120 and deselected elements 120.

In one embodiment, the mapping system 100 allows the user to filter the elements 120 in the map display 116 and the list display 124 according to selected preferences in the map display 116 or the list display 124. The user may open a filter dialog box having one or more filtering fields. When the user chooses a given filter, such as by selecting an option from a drop-down menu or entering a filtering keyword, the map display 116 and the list display 124 are updated to reflect the filtered results.

In one embodiment, the mapping system 100 is configured to display a list of menu options in response to receiving a cursor input in the map display 116 or the list display 124. The list of menu options may be shared by the map display 116 and the list display 124, such that the list of menu options includes the same menu options for both the map display 116 and the list display 124. In one embodiment, the cursor input includes a mouse click, a shortcut key, or other cursor input.

An embodiment of a mapping system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for coordinated geospatial and list-based mapping.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A computer program product, comprising:
a non-transitory computer readable storage medium to store a computer readable program, wherein the computer readable program, when executed by a processor within a computer, causes the computer to perform operations for coordinated geospatial and list-based mapping, the operations comprising:
presenting a map display on a display device, wherein the map display comprises elements within a viewing area of the map display, wherein the elements comprise geospatial characteristics, wherein the elements comprise selected and unselected elements;
presenting a list display on the display device, wherein the list display comprises a customizable list comprising the elements from the map display;
receiving a user input drawing a selection area in the viewing area of the map display, wherein the selection area is a user determined shape, wherein the selection area is smaller than the viewing area of the map display, wherein the viewing area comprises elements that are visible within the map display and are outside the selection area;
selecting any unselected elements within the selection area in response to the user input drawing the selection area and deselecting any selected elements outside the selection area in response to the user input drawing the selection area; and
synchronizing the map display and the list display to concurrently update the selection and deselection of the elements according to the user input, the selection and deselection occurring on both the map display and the list display.

2. The computer program product of claim 1, wherein the computer readable program, when executed on the computer, causes the computer to perform additional operations, comprising:
selecting an element in either the map display or the list display; and
concurrently synchronizing the map display and the list display to present the selected element in both the map display and the list display in a selected state.

3. The computer program product of claim 1, wherein displaying elements outside the selection area and within the viewing area in a deselected state further comprises:
deselecting elements outside the selection area in response to determining that all elements in the viewing area are selected before drawing the selection area.

4. The computer program product of claim 3, wherein the computer readable program, when executed on the computer, causes the computer to perform additional operations, comprising:
highlighting an element in either the map display or the list display;
displaying the highlighted element in a highlighted state in the map display and the list display.

5. The computer program product of claim 1, wherein the computer readable program, when executed on the computer, causes the computer to perform additional operations, comprising:
presenting the map display and the list display on the display device simultaneously.

6. The computer program product of claim 1, wherein the computer readable program, when executed on the computer, causes the computer to perform additional operations, comprising:
filtering the elements in the map display and the list display according to selected preferences in the map display or the list display.

7. The computer program product of claim 1, wherein the computer readable program, when executed on the computer, causes the computer to perform additional operations, comprising:
displaying a list of menu options in response to receiving a cursor input in the map display or the list display, wherein the list of menu options is shared by the map display and the list display.

8. A method for coordinated geospatial and list-based mapping, the operations comprising:
presenting a map display on a display device, wherein the map display comprises elements within a viewing area of the map display, wherein the elements comprise geospatial characteristics, wherein the elements comprise selected and unselected elements;
presenting a list display on the display device, wherein the list display comprises a customizable list comprising the elements from the map display;
receiving a user input drawing a selection area in the viewing area of the map display, wherein the selection area is a user determined shape, wherein the selection area is smaller than the viewing area of the map display, wherein the viewing area comprises elements that are visible within the map display and are outside the selection area;
selecting any unselected elements within the selection area in response to the user input drawing the selection area and deselecting any selected elements outside the selection area in response to the user input drawing the selection area; and
synchronizing the map display and the list display to concurrently update the selection and deselection of the elements according to the user input, the selection and deselection occurring on both the map display and the list display.

9. The method of claim 8, further comprising:
selecting an element in either the map display or the list display; and
concurrently synchronizing the map display and the list display to present the selected element in both the map display and the list display in a selected state.

10. The method of claim 8, wherein displaying elements outside the selection area and within the viewing area in a deselected state further comprises:
deselecting elements outside the selection area in response to determining that all elements in the viewing area are selected before drawing the selection area
displaying the selected elements in the map display and the list display in the selected state; and
displaying the deselected elements in the map display and the list display in a deselected state.

11. The method of claim 10, further comprising:
highlighting an element in either the map display or the list display;
displaying the highlighted element in a highlighted state in the map display and the list display.

12. The method of claim 8, further comprising:
presenting the map display and the list display on the display device simultaneously.

13. The method of claim 8, further comprising:
filtering the elements in the map display and the list display according to selected preferences in the map display or the list display.

14. The method of claim 8, further comprising:
displaying a list of menu options in response to receiving a cursor input in the map display or the list display, wherein the list of menu options is shared by the map display and the list display.

15. A geospatial and list-based mapping system, comprising:
a mapping engine configured to:
present a map display on a display device, wherein the map display comprises elements within a viewing area of the map display, wherein the elements comprise geospatial characteristics, wherein the elements comprise selected and unselected elements; and
present a list display on the display device, wherein the list display comprises a customizable list comprising the elements from the map display; and
a synchronizer configured to:
receive a user input to draw a selection area in the viewing area of the map display, wherein the selection area is a user determined shape, wherein the selection area is smaller than the viewing area of the map display, wherein the viewing area comprises elements that are visible within the map display and are outside the selection area;
select any unselected elements within the selection area in response to the user input drawing the selection area and deselect any selected elements outside the selection area in response to the user input drawing the selection area; and
synchronize the map display and the list display to concurrently update the selection and deselection of the elements according to the user input, the selection and deselection occurring on both the map display and the list display.

16. The system of claim 15, wherein the synchronizer is further configured to:
   select an element in either the map display or the list display; and
   concurrently synchronize the map display and the list display to present the selected element in both of the map display and the list display in a selected state.

17. The system of claim 15, wherein the synchronizer is further configured to:
   deselecting elements outside the selection area in response to determining that all elements in the viewing area are selected before drawing the selection area.

18. The system of claim 17, wherein the synchronizer is further configured to:
   highlighting an element in either the map display or the list display;
   displaying the highlighted element in a highlighted state in the map display and the list display.

19. The system of claim 15, wherein the synchronizer is further configured to: filtering the elements in the map display and the list display according to selected preferences in the map display or the list display.

20. The system of claim 15, wherein the computer readable program, when executed on the computer, causes the computer to perform additional operations, comprising:
   displaying a list of menu options in response to receiving a cursor input in the map display or the list display, wherein the list of menu options is shared by the map display and the list display.

* * * * *